United States Patent
Campbell et al.

(10) Patent No.: US 11,852,211 B2
(45) Date of Patent: Dec. 26, 2023

(54) ADDITIVELY MANUFACTURED ELLIPTICAL BIFURCATING TORSION SPRING

(71) Applicant: BAE SYSTEMS Information and Electronic Systems Integration Inc., Nashua, NH (US)

(72) Inventors: Benjamin K. Campbell, Nashua, NH (US); Robert Chadbourne, Bedford, NH (US); Ryan Dippel, Arlington, MA (US); Michael J. Shaw, Epsom, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 274 days.

(21) Appl. No.: 17/017,218

(22) Filed: Sep. 10, 2020

(65) Prior Publication Data

US 2022/0074458 A1    Mar. 10, 2022

(51) Int. Cl.
*F16F 1/10* (2006.01)
*F16F 1/04* (2006.01)
(Continued)

(52) U.S. Cl.
CPC ............... *F16F 1/10* (2013.01); *F16F 1/021* (2013.01); *F16F 1/043* (2013.01); *B33Y 80/00* (2014.12);
(Continued)

(58) Field of Classification Search
CPC .... F16F 1/10; F16F 1/021; F16F 1/043; F16F 2224/0216; F16F 2228/06; F16F 2238/024; B33Y 80/00
See application file for complete search history.

(56) References Cited

U.S. PATENT DOCUMENTS

| 435,385 | A | * | 9/1890 | Babbitt | .................. B62J 1/002 |
| | | | | | 297/202 |
| 2,573,806 | A | * | 11/1951 | Paterson | .................. A43C 7/00 |
| | | | | | 403/216 |

(Continued)

FOREIGN PATENT DOCUMENTS

| CN | 110104161 A | 8/2019 |
| DE | 1531357 A1 | 1/1970 |

(Continued)

OTHER PUBLICATIONS

Saleh et al., "Ti—6Al—4V Helical Spring Manufacturing via SLM: Effect of Geometry on Shear Modulus". Mar. 13, 2013 (Mar. 13, 2013) (online] (retrieved from the internet on Sep. 11, 2021) <URL http:1/www .iaeng.org/publication/MECS2013/IMECS2013_pp950-953.pdf>. entire document, especially Fig. 1; Abstract; I. Introduction.

(Continued)

*Primary Examiner* — Xuan Lan Nguyen
(74) *Attorney, Agent, or Firm* — Maine Cernota & Curran; Gary McFaline; Scott J. Asmus (57) ABSTRACT

A 3D printed additively manufactured (AM) elliptical bifurcating torsion flexure assembly system includes a base section; elliptical bifurcating torsion springs, each including a bifurcated legs section supported by the base; a bifurcated elliptical torsion spring section contiguous with the bifurcated legs section; and a single upper section contiguous with the elliptical torsion spring section. The single upper section includes a connection component, and the device material includes Hot Isostatic Pressing (HIP) heat-treated Ti6Al4V. The elliptical bifurcating torsion flexure assembly is printed as one part by a 3D additive manufacturing process, and the bifurcation maintains consistent balance while being torqued. The stiffness-spring rate of the device (Continued)

is at least partly controlled by varying cross-sectional shape and diameters by the 3D additive manufacturing printing.

20 Claims, 8 Drawing Sheets (51) Int. Cl.
F16F 1/02 (2006.01)
B33Y 80/00 (2015.01)
(52) U.S. Cl.
CPC ... F16F 2224/0216 (2013.01); F16F 2228/06 (2013.01); F16F 2238/024 (2013.01)

(56) References Cited

U.S. PATENT DOCUMENTS

| | | | |
|---|---|---|---|
| 3,413,640 A | 11/1968 | Freeman et al. | |
| 3,690,595 A | 9/1972 | Rusbach | |
| 3,803,751 A | 4/1974 | Pippin, Jr. | |
| 3,861,627 A | 1/1975 | Schoffl | |
| 3,918,664 A | 11/1975 | Grosswendt | |
| 3,921,937 A | 11/1975 | Voss et al. | |
| 3,965,611 A | 6/1976 | Pippin, Jr. | |
| 3,990,656 A | 11/1976 | Minnich | |
| 4,175,720 A | 11/1979 | Craig | |
| 4,351,499 A | 9/1982 | Maudal et al. | |
| 4,411,398 A | 10/1983 | Wedertz et al. | |
| 4,568,044 A | 2/1986 | Ditommaso et al. | |
| 4,586,681 A | 5/1986 | Wedertz et al. | |
| 4,635,881 A | 1/1987 | Brieseck et al. | |
| 4,691,880 A | 9/1987 | Frank | |
| 4,838,502 A | 6/1989 | Pinson et al. | |
| 5,004,186 A | 4/1991 | Hans et al. | |
| 5,240,203 A | 8/1993 | Myers | |
| 5,393,011 A | 2/1995 | Dunn et al. | |
| 5,615,847 A | 4/1997 | Bourlett | |
| 5,630,564 A | 5/1997 | Speicher et al. | |
| 5,671,899 A | 9/1997 | Nicholas et al. | |
| 5,904,319 A | 5/1999 | Hetzer | |
| 6,119,976 A | 9/2000 | Rogers | |
| 6,224,013 B1 | 5/2001 | Chisolm | |
| 6,446,906 B1 | 9/2002 | Voigt et al. | |
| 6,576,880 B2 | 6/2003 | Martorana et al. | |
| 6,588,700 B2 | 7/2003 | Moore et al. | |
| 6,668,542 B2 | 12/2003 | Baker et al. | |
| 6,880,780 B1 | 4/2005 | Perry et al. | |
| 7,175,131 B2 | 2/2007 | Dodu et al. | |
| 7,207,518 B2 | 4/2007 | Alculumbre et al. | |
| 7,556,220 B2 | 7/2009 | Schultz | |
| 7,856,929 B2 | 7/2010 | Gavin et al. | |
| 7,829,829 B2 | 11/2010 | King et al. | |
| 7,829,830 B1 | 11/2010 | Rogers | |
| 8,324,544 B2 | 12/2012 | Palani et al. | |
| 8,415,598 B1 | 4/2013 | Terhune et al. | |
| 8,476,564 B2 | 7/2013 | Henry et al. | |
| 8,686,329 B2 | 4/2014 | Barry | |
| 9,085,333 B1 * | 7/2015 | Watts | B62J 1/10 |
| 9,989,338 B2 | 6/2018 | Osdon | |
| 2006/0071120 A1 | 4/2006 | Selin et al. | |
| 2006/0163423 A1 | 7/2006 | Parine | |
| 2008/0082420 A1 | 4/2008 | Kargman et al. | |
| 2009/0127378 A1 | 5/2009 | Turner et al. | |
| 2010/0050712 A1 | 3/2010 | Tong | |
| 2012/0074256 A1 | 3/2012 | Pietrzak et al. | |
| 2012/0119014 A1 | 5/2012 | Barry et al. | |
| 2012/0175460 A1 | 7/2012 | Palani | |
| 2014/0203134 A1 | 7/2014 | Plumer | |
| 2016/0349025 A1 | 12/2016 | Osdon | |
| 2017/0131074 A1 | 5/2017 | Lutzenberger | |
| 2021/0063127 A1 | 3/2021 | Cleveland | |

FOREIGN PATENT DOCUMENTS

| | | | |
|---|---|---|---|
| EP | 2295928 A1 | 3/2011 | |
| EP | 2416104 A2 | 8/2012 | |
| EP | 2556327 B1 | 8/2016 | |
| KR | 100868686 B1 * | 11/2008 | F16F 1/10 |
| WO | 2002018867 A1 | 3/2002 | |

OTHER PUBLICATIONS

International Search Report, PCT/US21/48629, dated Dec. 20, 2021, 11 pages.
Notice of Allowance for U.S. Appl. No. 16/552,575 dated Mar. 1, 2022, 7 Pages.
International Preliminary Report on Patentability for Appl No. PCT/US2011/031074 dated Oct. 9, 2012, 5 pages.
International Preliminary Report on Patentability for Appl No. PCT/US2011/031718 dated Oct. 9, 2012, 6 pages.
US Statutory Invention Registration H1219, Aug. 3, 1993, Miller.
International Preliminary Report on Patentability for Appl No. PCT/US2011/031584 dated Oct. 9, 2012, 6 pages.
Office Action for Patent Appl. No. 161552,575, dated Aug. 16, 2021, 23 Pages.
International Search Report, PCT/US20/47971, dated May 4, 2021, 9 pages.

* cited by examiner

FIG. 1

EMBODIMENT IN OPERATIONAL ENVIRONMENT

WINGS DEPLOYED BY TORSION SPRINGS — 105

TEST CONFIGURATION

ADDITIVELY MANUFACTURED ELLIPTICAL BIFURCATING TORSION SPRING

FIELD OF THE DISCLOSURE

This disclosure relates to flexure components and, more particularly, to a 3D printed, additively manufactured, elliptical bifurcating torsion spring.

BACKGROUND

Spring assemblies are used in a wide variety of applications, some with more constraints than others. Some applications require a force exerted via a spring/flexure in a confined space. Conventional torsion springs do not fit in tight spaces, and need to be tuned to specific requirements, so flexures are used. Typical torsion springs are round, and exhibit hysteresis inherent to an assembly of springs rubbing against the rotating spring arm. One example of an application with such constraints is the deployment of wings/control surfaces on precision guided munitions. Here, reliability, weight, parts count, and cost are paramount.

What is needed, therefore, is a device, system and method with improved Size Weight Power and Cost (SWaP-C) necessary for better performing springs and flexures for a reliable, light-weight, decreased part-count, low-hysteresis flexure system for constrained spaces.

SUMMARY

An embodiment provides a flexure device comprising at least one elliptical bifurcating torsion spring comprising a bifurcated legs section supported by the base; a bifurcated elliptical torsion spring section contiguous with the bifurcated legs section; a single upper section contiguous with the elliptical torsion spring section, the single upper section comprising a connection component; and wherein the at least one elliptical bifurcating torsion spring is printed as an integral part by an additive manufacturing process. In embodiments, the bifurcated torsion spring is configured to maintain a balance while being torqued. In other embodiments, a material of the device comprises Ti6Al4V. In subsequent embodiments the device comprises a 3D printed spring flexure comprising a plurality of the elliptical bifurcating torsion springs. For additional embodiments the device comprises an assembly comprising eight the elliptical bifurcating torsion springs. In another embodiment a stiffness-spring rate of the device comprises varying cross-sectional diameters by the 3D additive manufacturing printing. For a following embodiment, a tensile stiffness of the device is between about 14.7 and about 18.2 Msi. In subsequent embodiments a tensile stiffness of the device is about 18.2 Msi. In additional embodiments a near-linear force versus displacement of the device the device is between about 0 and 19 pounds and −0.2 to +0.4 inches deflection, respectively. In included embodiments a near-linear force versus displacement of the device the device is between about 0 and 27 pounds and about −0.2 to +0.25 inches deflection, respectively. In yet further embodiments the device comprises a wing-deployment mechanism. In related embodiments proportionate lengths of the sections comprise the elliptical torsion spring section is approximately equal to the single upper section; the connection component comprises approximately one-half of the single upper section; the bifurcated legs section is approximately one-half of the bifurcated elliptical torsion spring section. For further embodiments, a diameter of the base section is approximately 2.5 inches; and a height of spring flexure elements is approximately 2.5 inches. In ensuing embodiments an average spring hysteresis is less than about 0.01 lb.-in.

Another embodiment provides an additive manufacturing method for 3D printing an elliptical bifurcating torsion flexure device comprising printing a base section; printing a bifurcated legs section supported by the base; printing a bifurcated elliptical torsion spring section contiguous with the bifurcated legs section; and printing a single upper section contiguous with the elliptical torsion spring section, the single upper section comprising a connection component; whereby at least one elliptical bifurcating torsion spring is printed as one part by the 3D printing additive manufacturing process; and wherein the bifurcation maintains consistent balance while being torqued. For yet further embodiments, a stiffness-spring rate is determined at least partly by varying a cross sectional diameter by the 3D printing. For more embodiments a stiffness-spring rate is determined at least partly by varying a cross sectional diameter by the 3D printing wherein a cross sectional diameter of the bifurcated elliptical torsion spring section is 0.08 to 0.25 inch. Continued embodiments include a stiffness-spring rate determined at least partly by varying a cross sectional diameter by the 3D printing; wherein a cross sectional diameter of the bifurcated legs section is 0.08 to 0.25 inch. For additional embodiments a stiffness-spring rate is determined at least partly by varying a cross sectional diameter by the 3D printing; wherein a cross sectional diameter of the single upper section is 0.08 to 0.25 inch.

A yet further embodiment provides a 3D additively manufactured elliptical bifurcating torsion flexure assembly system comprising a base section; eight elliptical bifurcating torsion springs, each comprising a bifurcated legs section supported by the base; a bifurcated elliptical torsion spring section contiguous with the bifurcated legs section; and a single upper section contiguous with the elliptical torsion spring section, the single upper section comprising a connection component; wherein a material of the device comprises Hot Isostatic Pressing (HIP) heat-treated Ti6Al4V; wherein a diameter of the base section is approximately 2.5 inches; wherein a height of spring flexure elements is approximately 2.5 inches; wherein a cross sectional diameter of the elliptical torsion spring section is 0.08 to 0.25 inches; wherein a cross sectional diameter of the bifurcated legs section is 0.08 to 0.25 inches; wherein a cross sectional diameter of the single upper section is 0.08 to 0.25 inches; wherein the elliptical bifurcating torsion flexure assembly is printed as one part by a 3D additive manufacturing process; and wherein the bifurcation maintains consistent balance while being torqued.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments apply to any custom spring/flexure application where typical torsion spring assemblies need to be specifically tuned to achieve optimal stiffness, force/deflection profile, and weight while reducing part count and eliminating hysteresis inherent to spring assemblies. The deployment of wings/control surfaces is one example. In embodiments, the spring assembly is the component that pushes the wings through the protective wing slot seals for deployment and therefore proper flight. Therefore, the spring assembly is a mission critical component. 3D printed titanium spring embodiments remove friction and hysteresis, providing reliable and repeatable actuating performance. Being 3D printed, the torsion spring can be tuned to specific stiffness with varying cross sectional diameters and custom load paths. By utilizing Additive Manufacturing (AM), embodiments increase performance, decrease weight 67%, decrease part count from 75 to 2, and decrease cost.

The new shape of this spring flexure can be used in areas where there is confined space. As mentioned, typical torsion springs are round, whereas embodiments are elliptical and bifurcating (dividing in two to keep consistent balance while being torqued or preloaded). Embodiments are printed as one part, and remove hysteresis inherent to an assembly of springs rubbing against the rotating spring arm. Applications include any scenario that needs a force exerted via a spring/flexure in a tall, narrow space.

Figure 1:
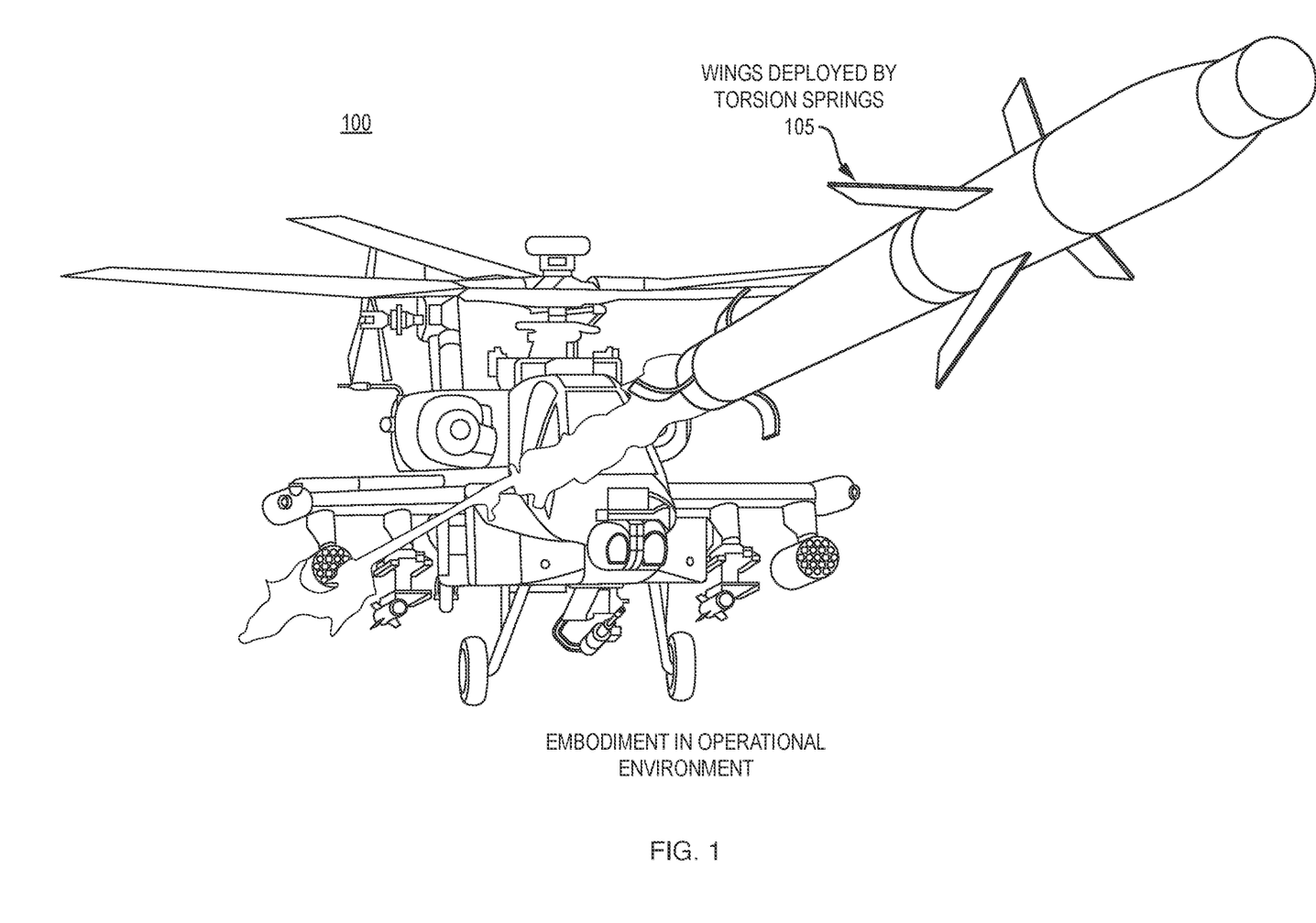
FIG. 1 depicts an application environment for an embodiment.

FIG. 1 depicts an embodiment in an operational environment 100. View of projectile shows four wings 105 deployed by torsion spring embodiments. In applications involving precision guided munitions, wings, canards, flaperons, and related members are used to guide the munition and in some examples are deployed by a spring member such that the member is stowed until deployed.

Figure 2:
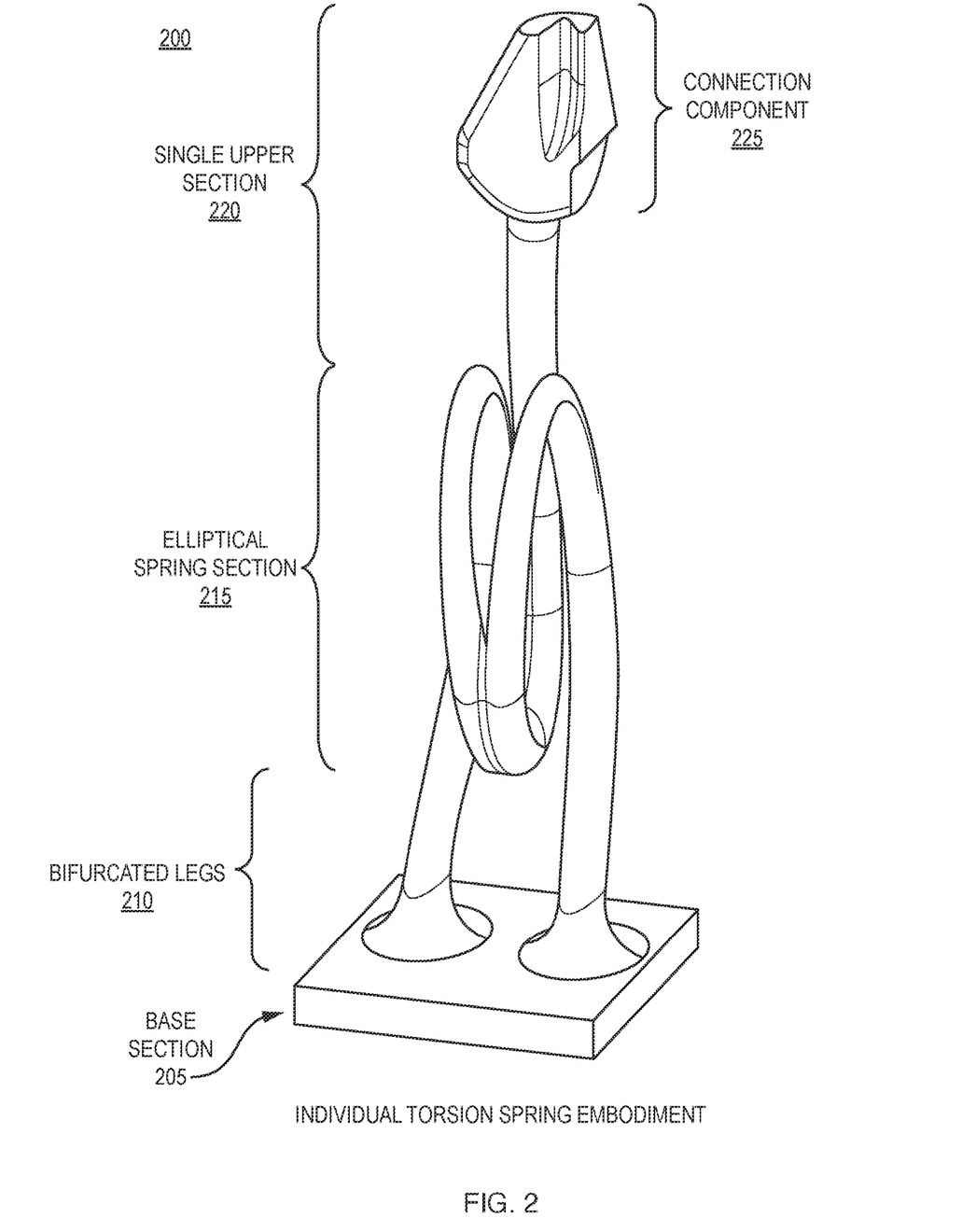
FIG. 2 depicts a single spring flexure element configured in accordance with an embodiment.

FIG. 2 depicts a single device embodiment 200. Device 200 elements comprise a base 205; a pair of bifurcated legs 210, bifurcated elliptical torsion spring section 215, a single upper-section 220 and connection component 225. Bifurcating components (dividing in two) maintains consistent balance while being torqued, so the spring arm only rotates about the correct axis, and minimizes rotation in the other two orthogonal axes. Application embodiment dimensions in one example include a cross sectional diameter of the bifurcated legs of 0.08 to 0.25 inch; a cross sectional diameter of the elliptical spring section of 0.08 to 0.25 inch; and a cross sectional diameter of the single upper section of 0.08 to 0.25 inch. Dimensions of the spring assembly in this example are roughly 2.5 inches in base diameter, and the spring flexure elements are roughly 2.5 inches tall. FIG. 2 shows the coils 'merging' to a single unit on the lower half of the coil. The merge is located midway up the ellipse to be away from the bottom where the maximum stress is, so there is no stress concentration at the merge point. In embodiments, the base is integral with the precision guided kit.

For embodiments, Ti6AlV4 was chosen because of its modulus (stiffness) and its high strength to fit the force/deflection profile. However, in embodiments, a different force/deflection profile employs a different material such as 316 Stainless Steel, 17-4 PH Stainless Steel, Aluminum AlSi 10 Mg, or other tool steels to dial in the stiffness for the application. Embodiment temperature requirements were tested at −40 C to 60 C based on program requirements, other embodiments can be tuned for any temperature range. Embodiments of this spring are made with the Direct Metal Laser Melting (DMLM) process. Other embodiments are made with Electron Beam Melting (another powder bed fusion process) and binder jetting. For embodiments, the elliptical shape is determined by the space requirements of the application. With differently shaped spaces, the geometry can be customized to fit in any volume, provided it can achieve the same stiffness.

Figure 3:
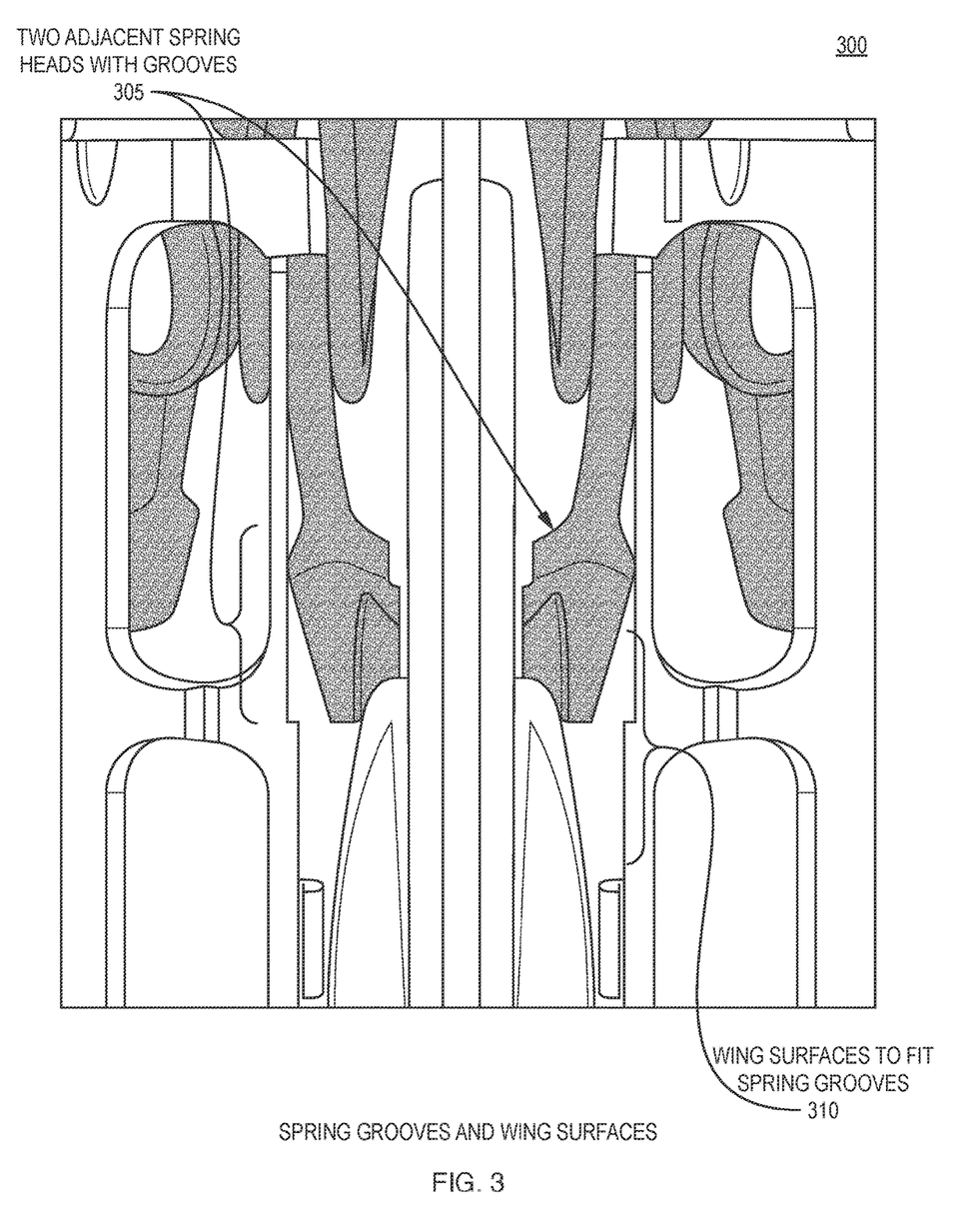
FIG. 3 depicts spring grooves and wing surfaces configured in accordance with an embodiment.

FIG. 3 shows spring engagement 300 with the wing body surfaces. In embodiments the spring heads 305 are custom designed to contact the wing 310 in the appropriate place with grooves that keep the wing contained as it is being deployed. This feature can be printed to contact any type of surface. Additive manufacturing enables custom contact methods for different applications. For embodiments, the wings are held in place by a spring plunger, independent of the spring. Once the spring plunger is moved, the springs are free to push the wings through the wing slot seals.

Figure 4:
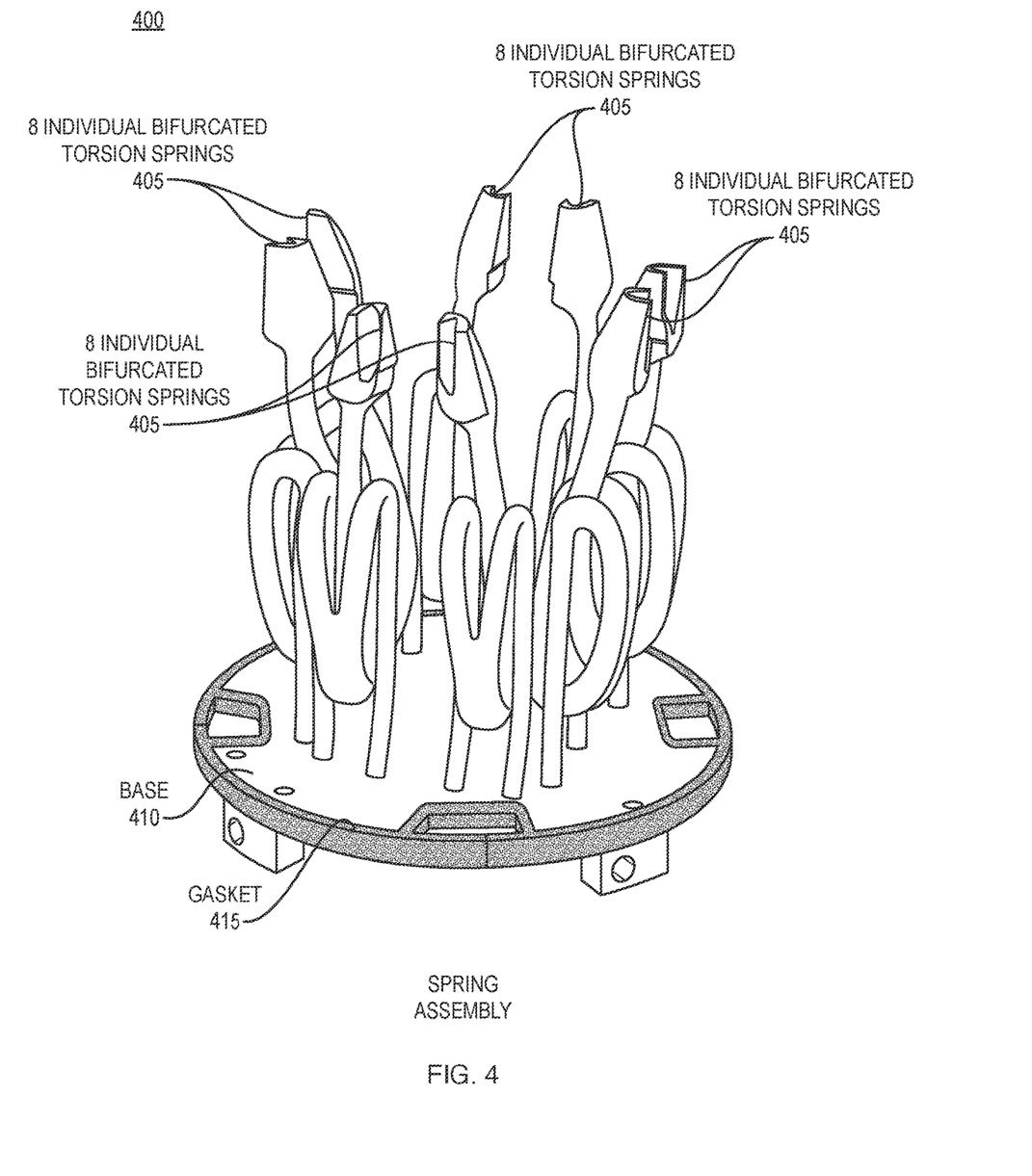
FIG. 4 depicts a 3D printed titanium spring flexure assembly configured in accordance with an embodiment.

FIG. 4 depicts a spring assembly 400. Assembly 400 comprises eight individual torsion springs 405 on base 410. In embodiments, these are printed all as one metal part, with a bonded EMI gasket 415 around the base which makes it an assembly of two parts. For embodiments, the metal part is designed to be 3d printed, needing minimal support structure.

Figure 5:
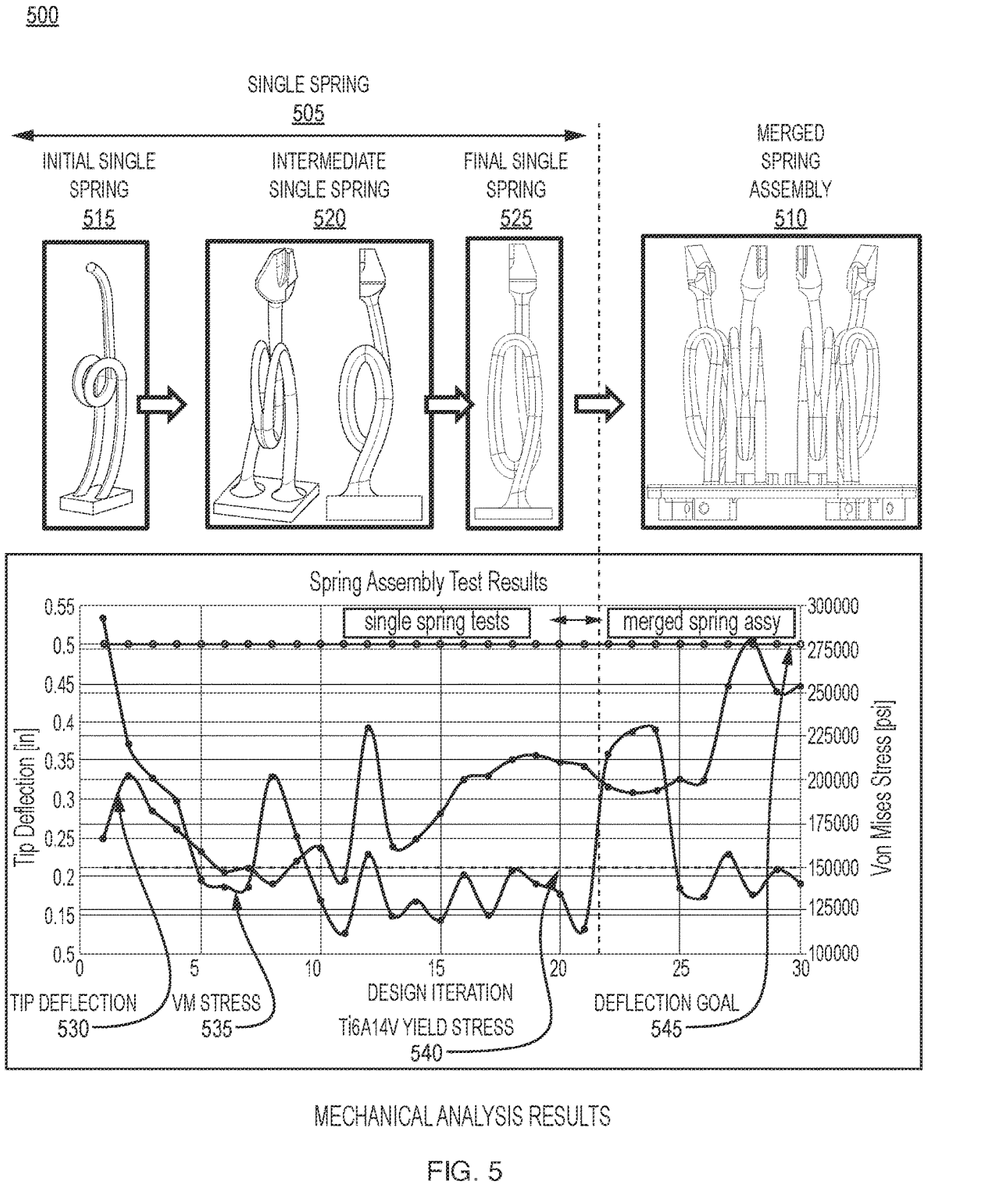
FIG. 5 depicts mechanical analysis results in accordance with an embodiment.

FIG. 5 depicts mechanical analysis results 500 for an initial single spring embodiment 505, and then merged spring assembly 510. It shows the maturation of the spring flexure design and the design/analysis iterations performed to tune the stiffness to the particular application. Single spring design embodiments comprise initial single spring design 515, intermediate single spring design (two views) 520, and single spring final design 525. Initial single spring design 515 comprises a circular spring section. Intermediate single spring design 520 comprises an elliptical spring section. Single spring final design 525 comprises an oval spring section. Merged spring assembly 510 comprises four individual spring flexure pairs designed to make contact with the missile wings and deploy properly. Thirty design iterations are presented in the test results. Curves are Tip Deflection 530; VM Stress 535; Ti6Al4V Yield Stress 540; and Deflection Goal 545. Stress data is given in psi (Von Mises Stress). Tip deflection 530 ranges from about 0.19 to about 0.5 inches. VM Stress 535 ranges from about 112,500 psi to about 230,000 psi. Ti6Al4V Yield Stress 540 is about 150,000 psi. The Deflection Goal 545 is 0.5 inches. Merged spring assembly iteration 28 achieved the tip deflection goal of 0.5 inch.

Figure 6:
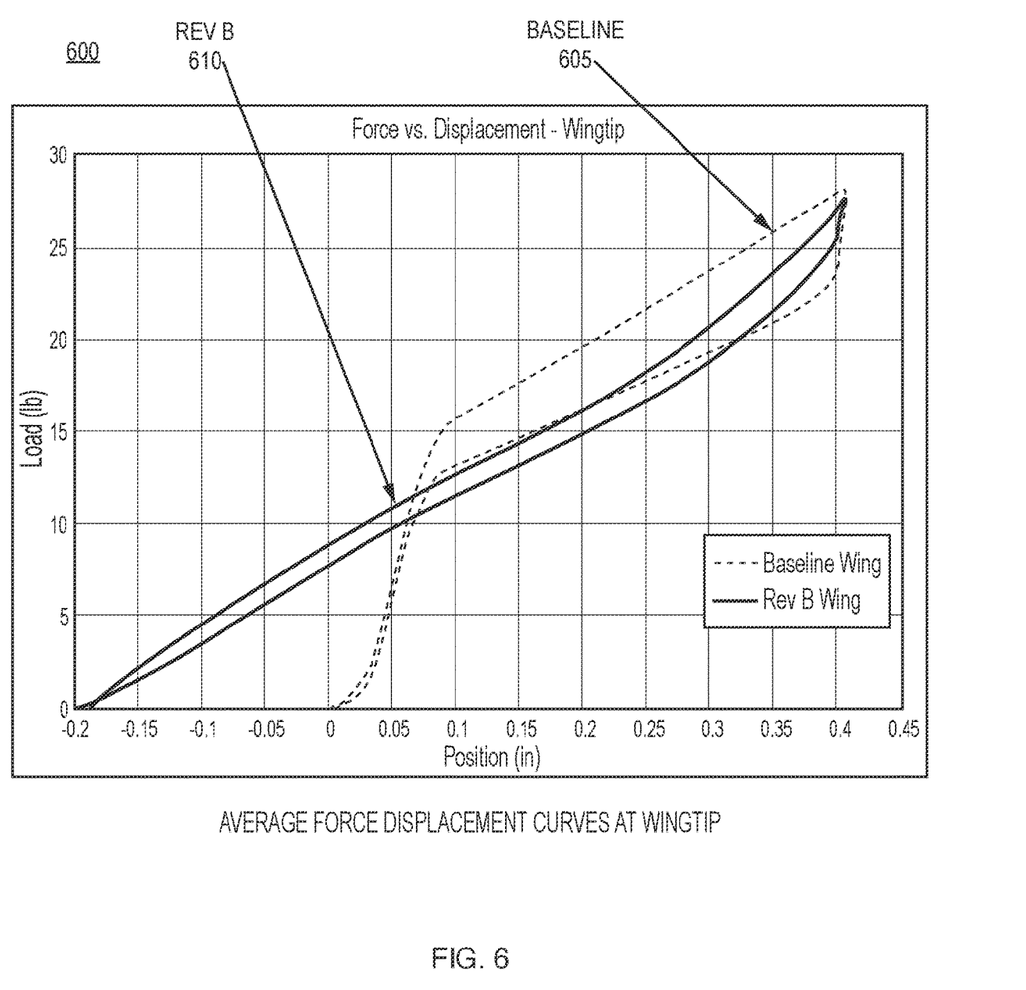
FIG. 6 is a graph comparing average force-displacement curves for deployment of wings at the wingtip configured in accordance with an embodiment.

FIG. 6 is a graph 600 comparing average force-displacement curves at the wingtip. Displayed are Baseline 605, and Rev B 610. As can be seen, average force in pounds load versus position in inches progresses from the most-variable. The Rev B 3D printed spring flexure design embodiment shows tuning for the exact application, and tracks the force/deflection curve of the baseline design, while exhibiting less hysteresis.

Figure 7:
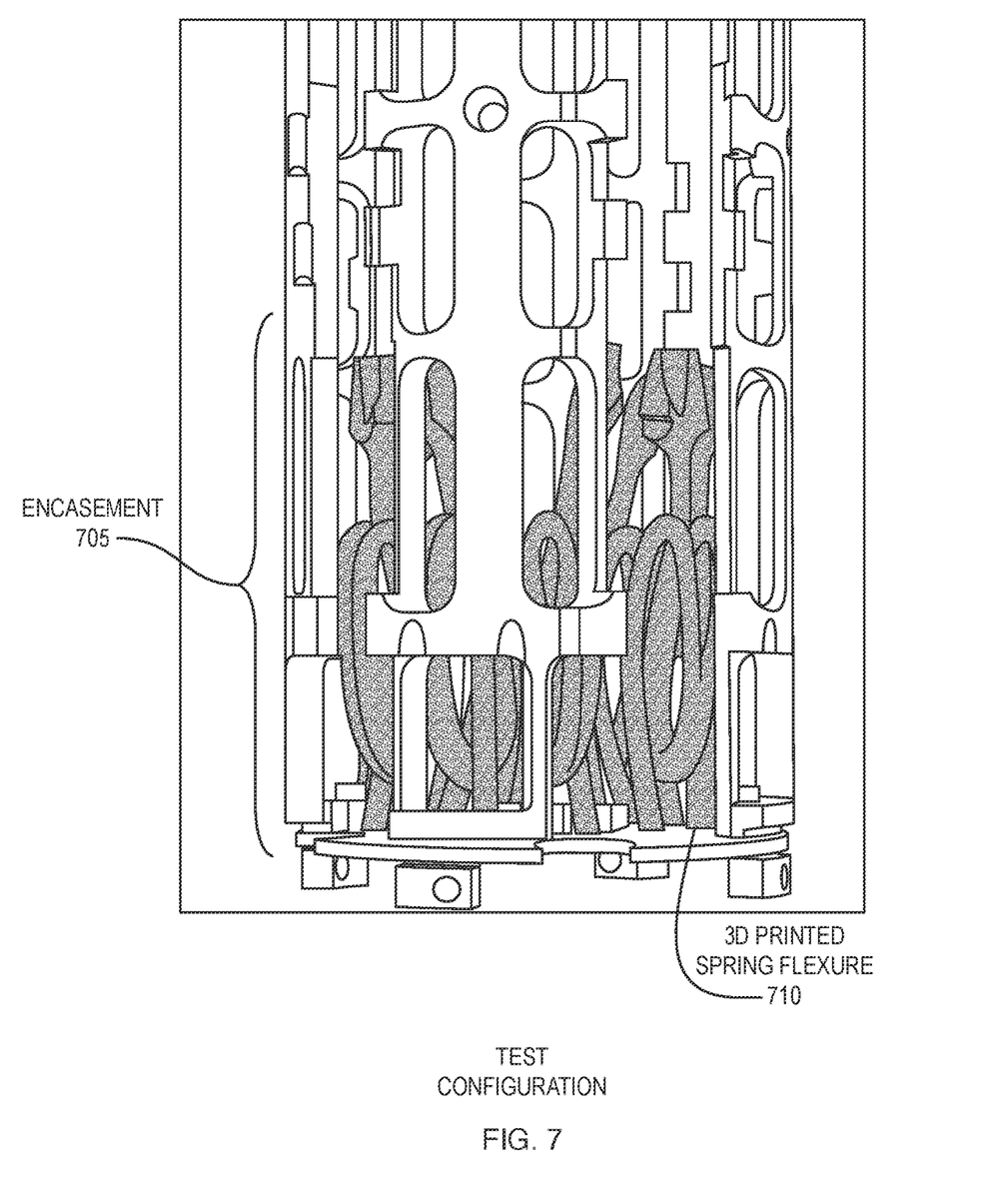
FIG. 7 depicts a test configuration of a torsion spring assembly configured in accordance with an embodiment.

FIG. 7 depicts a test configuration 700 of a torsion spring assembly embodiment. Eight torsion springs are shown in an encasement 705 supporting the 3D printed spring flexure assembly 710.

Figure 8:
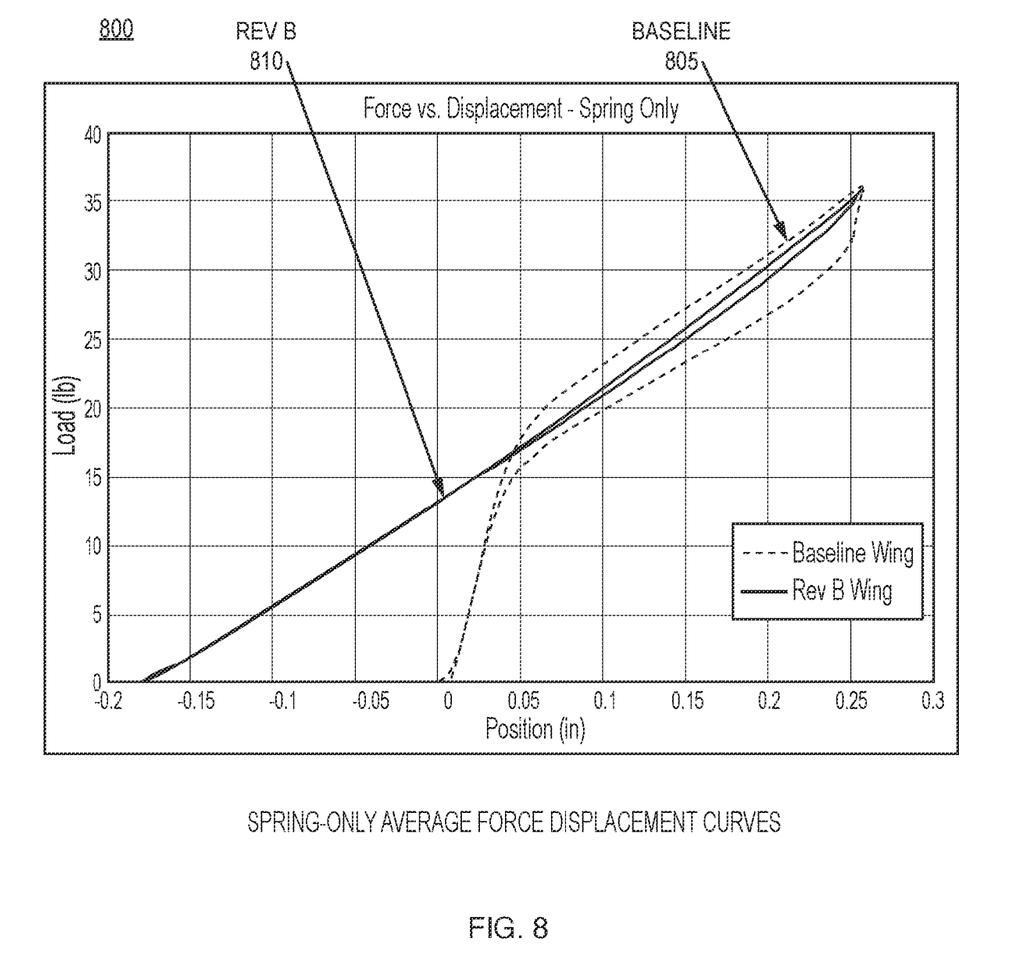
FIG. 8 is a graph comparing spring-only average force-displacement curves configured in accordance with an embodiment.

FIG. 8 is a graph 800 comparing spring-only average force-displacement curves. Displayed are Baseline 805 and latest Rev B design 810. As can be seen, average force in pounds load versus position in inches is contrasted between the most-variable Baseline 805 and the least-variable Rev B 810. Rev B 810 exhibits a very-near-linear force versus displacement between about 0 and 37 pounds and about −0.2 to +0.25 inches.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A flexure device, comprising:
   a base;
   at least one elliptical bifurcating torsion spring comprising:
   a bifurcated legs section supported by the base;
   a bifurcated elliptical torsion spring section contiguous with said bifurcated legs section;
   a single upper section contiguous with and extending away from said elliptical torsion spring section, said single upper section comprising a connection component; and
   wherein said flexure device is printed as one part by an additive manufacturing process.

2. The device of claim 1, wherein said elliptical bifurcating torsion spring is configured to maintain a balance while being torqued.

3. The device of claim 1, wherein a material of said device comprises Ti6Al4V.

4. The device of claim 1, wherein said device comprises:
   a 3D printed spring flexure comprising a plurality of said elliptical bifurcating torsion springs.

5. The device of claim 4, wherein the 3D printed spring flexure comprises eight said elliptical bifurcating torsion springs.

6. The device of claim 1, wherein at least one of the bifurcated elliptical torsion spring section, the bifurcated legs section and the single upper section comprises varying cross-sectional diameters by said 3D additive manufacturing printing.

7. The device of claim 1, wherein a tensile stiffness of said device is between about 14.7 and about 18.2 Msi.

8. The device of claim 1, wherein a tensile stiffness of said device is about 18.2 Msi.

9. The device of claim 1, wherein a near-linear force versus displacement of said device is between about 0 and 19 pounds and −0.2 to +0.4 inches deflection, respectively.

10. The device of claim 1, wherein a near-linear force versus displacement of said device is between about 0 and 27 pounds and about −0.2 to +0.25 inches deflection, respectively.

11. The device of claim 1, wherein said connection component is configured to couple with a wing-deployment mechanism.

12. The device of claim 1, wherein proportionate lengths of said sections comprise:
   said elliptical torsion spring section is approximately equal to said single upper section;
   said connection component comprises approximately one-half of said single upper section;
   said bifurcated legs section is approximately one-half of said bifurcated elliptical torsion spring section.

13. The device of claim 1, wherein a diameter of said base section is approximately 2.5 inches; and
   a height of spring flexure elements is approximately 2.5 inches.

14. The device of claim 1, wherein an average spring hysteresis is less than about 0.01 lb.-in.

15. An additive manufacturing method for 3D printing an elliptical bifurcating torsion flexure device comprising:
   printing a base section;
   printing a bifurcated legs section on said base;
   printing a bifurcated elliptical torsion spring section contiguous with said bifurcated legs section; and
   printing a single upper section contiguous with said elliptical torsion spring section on a first end, said single upper section comprising a connection component on an opposing end;
   wherein the base section, bifurcated legs section, bifurcated elliptical torsion spring section, single upper section and connection component are printed as one part by said 3D printing additive manufacturing process; and
   wherein said bifurcation maintains consistent balance while being torqued.

16. The method of claim 15, wherein a stiffness-spring rate is determined at least partly by varying a cross sectional diameter of at least one of the bifurcated elliptical torsion spring section, the bifurcated legs section and the single upper section, by said 3D printing.

17. The method of claim 16, wherein said stiffness-spring rate is determined at least partly by varying said cross sectional diameter by said 3D printing; wherein said cross sectional diameter of said bifurcated elliptical torsion spring section is 0.08 to 0.25 inch.

18. The method of claim 16, wherein said stiffness-spring rate is determined at least partly by varying said cross sectional diameter by said 3D printing; wherein said cross sectional diameter of said bifurcated legs section is 0.08 to 0.25 inch.

19. The method of claim 16, wherein said stiffness-spring rate is determined at least partly by varying said cross sectional diameter by said 3D printing; wherein said cross sectional diameter of said single upper section is 0.08 to 0.25 inch.

20. A 3D additively manufactured elliptical bifurcating torsion flexure assembly system comprising:
    a base section;
    eight elliptical bifurcating torsion springs, each comprising:
        a bifurcated legs section supported by said base;
        a bifurcated elliptical torsion spring section contiguous with said bifurcated legs section; and
        a single upper section contiguous with said elliptical torsion spring section, said single upper section comprising a connection component;
    wherein a material of said device comprises Hot Isostatic Pressing (HIP) heat-treated Ti6Al4V;
    wherein a diameter of said base section is approximately 2.5 inches;
    wherein a height of spring flexure elements is approximately 2.5 inches;
    wherein a cross sectional diameter of said elliptical torsion spring section is 0.08 to 0.25 inches;
    wherein a cross sectional diameter of said bifurcated legs section is 0.08 to 0.25 inches;
    wherein a cross sectional diameter of said single upper section is 0.08 to 0.25 inches;
    wherein said elliptical bifurcating torsion flexure assembly is printed as one part by a 3D additive manufacturing process; and
    wherein said bifurcation maintains consistent balance while being torqued.

\* \* \* \* \*